United States Patent [19]
Aldridge et al.

[11] Patent Number: 4,498,082
[45] Date of Patent: Feb. 5, 1985

[54] METHOD AND APPARATUS FOR LOCATING A DISCONTINUITY IN A DATA TRANSMISSION RING

[75] Inventors: Peter J. Aldridge, Apperley; Stephen J. Harris, Cheltenham, both of England

[73] Assignee: Allied Corporation, Morris Township, Morris County, N.J.

[21] Appl. No.: 342,564

[22] Filed: Jan. 25, 1982

[30] Foreign Application Priority Data

Jan. 30, 1981 [GB] United Kingdom ............... 8103166

[51] Int. Cl.³ .............................................. H04Q 9/00
[52] U.S. Cl. .......................... 340/825.16; 340/825.05; 371/11
[58] Field of Search ...................... 340/825.05, 825.16; 370/13; 371/11, 22; 179/175.31 R

[56] References Cited

U.S. PATENT DOCUMENTS 4,229,816 10/1980 Breidenstein et al. ............... 370/13
4,271,506  6/1981 Broc et al. ........................... 370/13
4,402,082  8/1983 Cope ..................................... 371/11

Primary Examiner—Donald J. Yusko
Attorney, Agent, or Firm—Joel I. Rosenblatt

[57] ABSTRACT

A method and apparatus for locating a discontinuity in a data transmission ring which has a plurality of stations which randomly receive and transmit data along the ring, in which the occurrence of valid and invalid data is sensed and compared and an indication given of the invalid data exceeds valid data by a predetermined amount, transmitting valid data responsive to the indication so that the indication can be removed from stations which receive valid data and transmitting data including station identification from any station showing the identification, which data is received at a separate station located between the discontinuity and the transmitter whereby the locality of the discontinuity can be identified.

16 Claims, 9 Drawing Figures

METHOD AND APPARATUS FOR LOCATING A DISCONTINUITY IN A DATA TRANSMISSION RING

FIELD OF THE INVENTION

This invention is related to a ring or a loop communications network where data in packets is transmitted randomly from stations connected in the loop.

BACKGROUND OF THE INVENTION

Ring communications involving data transmission is well-known. One such loop transmission scheme is shown in the specification of U.S. Pat. No. 4,064,486.

These rings or loops are used to transmit data in the form of binary encoded signals over relatively large distances.

In most commonly used rings or loops, provision is made for physically interconnecting and removing stations, as well as placing the communication paths through or over physical obstacles.

In use, the data ring may experience a break somewhere in a widely dispersed network. For example, the network may be placed between buildings or between separate levels in a building, or through cable ways making examination of each separate piece of cable difficult and expensive, as well as time consuming. Accordingly, past devices have not had a fast easy method or apparatus for identifying the location of the cable fault or at least localizing it so that repairs can be quickly directed to the location of the damaged cable, effecting rapid reestablishment of the data network.

In most ring communication networks, each station's timing clock is derived from the ring data rate. Decoders separate the timing signal and the data signals from the ring loop data and then use the timing signals to synchronize the station clock.

Additionally, and as in most rings, a match of a station address with an incoming information packet destination address is required before the data is extracted from a packet.

In past systems, data defining the address of the station was loaded in parallel to a station register and then that stored address was compared bit by bit with an incoming destination address in a packet.

SUMMARY OF THE INVENTION

In this present invention a method and apparatus is disclosed for locating a cable break in a data ring which may be used with binary coded signals transmitted around the ring from station to station.

Data may or may not be transmitted in packets. The data is transmitted in the data format such as Manchester coding, for example. Invalid data is a departure from that format while valid data is the occurrence of the data in conformance with that format. Means are provided as is known in the art for detecting a departure from that format and the occurrence of invalid data and for detecting the conformance of the data with that format and the occurrence of valid data.

Stations are serially connected in a data transmission ring and randomly receive and transmit data along the ring. Stations sense the occurrence of valid and invalid data and compare the number of valid data occurrences occurring at the stations. The stations provide an indication when invalid data occurrences exceed the valid data occurrences by a predetermined amount. The stations then initiate the transmission of valid data responsive to the indication and the invalid data indications at stations receiving the transmitted valid data are then removed. A station with an invalid data indication remaining, after a predetermined time, then initiates a data transmission including its own station identification. That transmission is received by another station located in the ring between the ring discontinuity and the transmitting stations localizing the discontinuity.

In any data transmission system, valid data may be defined by any suitable definition such as the format of the data, which may be Manchester code. Invalid data is a departure from that definition.

A means is provided for sensing that departure and indicating the occurrence of invalid data by a flag or other suitable indication. A station interconnected in the ring, responsive to a stream of invalid data, reinitiated valid data to the next station along the ring. Each station receiving the reinitiated valid data from a preceding ring station and responsive to that valid data removes its indication of invalid data. Any station not receiving valid data, as for example a station separated from a preceding station by a break in the ring, would continue to experience invalid data and maintain its invalid data flag.

Responsive to an invalid data flag and after a predetermined time, that station would initiate a transmission including its own station identification. That transmission would then be received by a monitor or any other station located in the ring between the transmitting station and the cable break.

Where a cable break in the ring is immediately upstream of a station, then that station's invalid data flag would continue as the valid data sent by a preceding station and separated by the break cannot be transmitted through the break. After a predetermined time, that station continuing to experience invalid data would transmit its identification which would be received on a monitor or by another station. Once the station is recognized, repair efforts may be directed to the transmitting station, to that portion of the ring between the transmitting station.

In this way, the section of the loop suffering a break may be quickly identified and physical repair efforts is directed to that specific location.

Additionally, a method and apparatus is shown for deriving clock signals from the ring data stream related to the data bit transition time.

While the prior art contains many examples of synchronizing a station clock with a data rate in the ring, this present device provides a method and apparatus for providing a timing pulse specifically at a bit transition time and for deriving the data clock from data transmitted in a format where the direction of the data bit transition at a data bit time indicates a data bit state. The timing signal is then processed through a conventional phase lock loop to provide a clock for each station. The data state is detected as being in a first or second state and a first logic element is unmasked, and a second logic element is masked responsive to the first data state. Ultimately, when the data is in a second state, the second logic element is unmasked and the first logic element is masked. Then, the data in the first or second state is provided to the first and second logic elements simultaneously and the unmasked logic element responsive to the data periodically generates a timing signal responsive to the loop data rate.

Specifically, edge detectors are alternately masked and unmasked responsive to the data state. A timing pulse is derived independently of the data state and with an edge substantially at bit time.

Decoded data in a first state (i.e. binary 1) may mask a first edge detector and unmask a second edge detector. In a second state, (i.e. binary 0) the data may be used to unmask the second edge detector and mask the first edge detector. Where the data state is defined by the data bit edge transition direction at bit time, edge detectors, compatible with respective data states are unmasked responsive to the instant data state to provide a timing pulse responsive to the bit time and the presence of an edge transition at that bit time. The timing pulse is then processed through a conventional phase lock loop to provide a clock phase adjusted to the date in the loop.

Additionally, a method and means is provided for serially loading the station address through a single terminal into the station interconnect device for comparison with the destination address on an incoming packet, when the packet is received.

Specifically, a timing state decoder controls the loading of the address data into the shift register approximately at the start of an incoming packet and then a short time later causes timing pulses to be transmitted to the address register for shifting the address data serially into a station interconnect device bit by bit in synchronism for comparison with the incoming destination address. In this way, a single terminal is used in the station for loading the station address each time an address comparison is made.

As, for example, when a full incoming packet is received.

The accompanying drawings show an example of ring or loop communications network according to the present invention in which.

Figure 1:
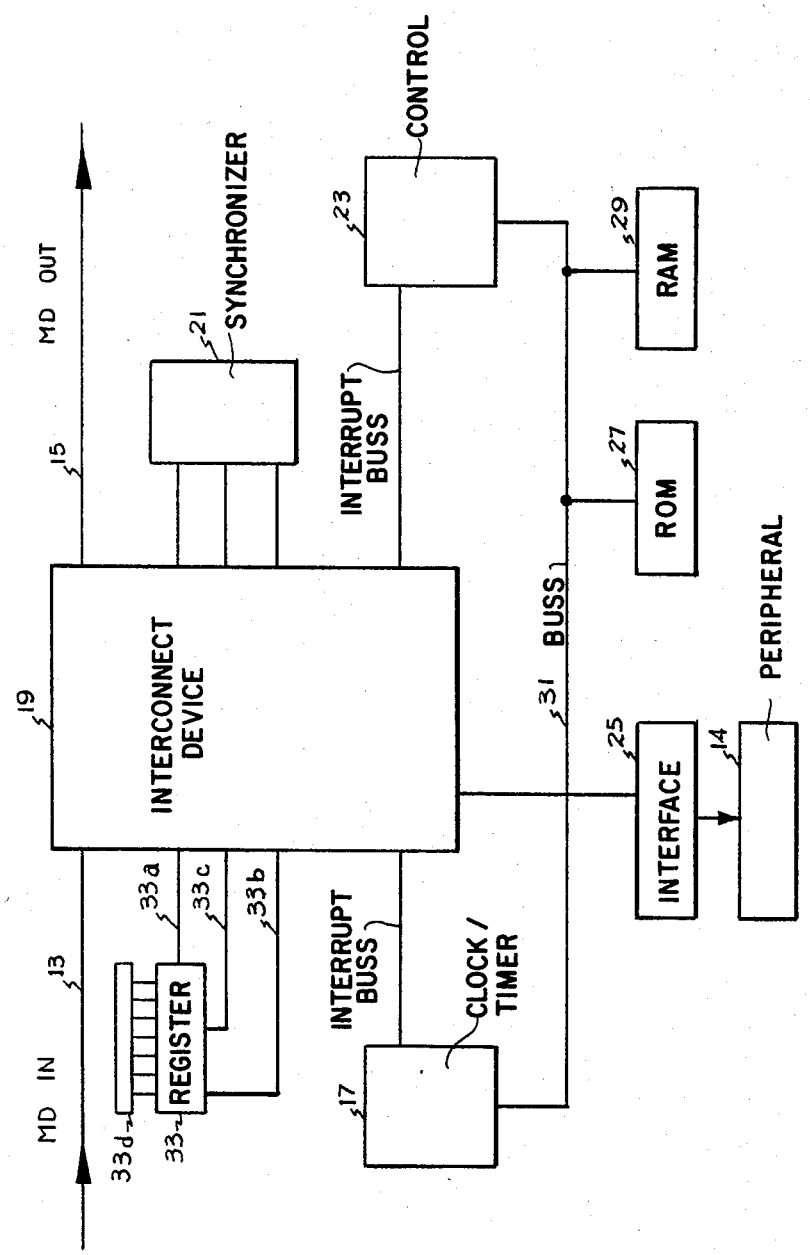
FIG. 1 shows a station serially placed in a data ring, including the elements comprised by the station.
Figure 3:
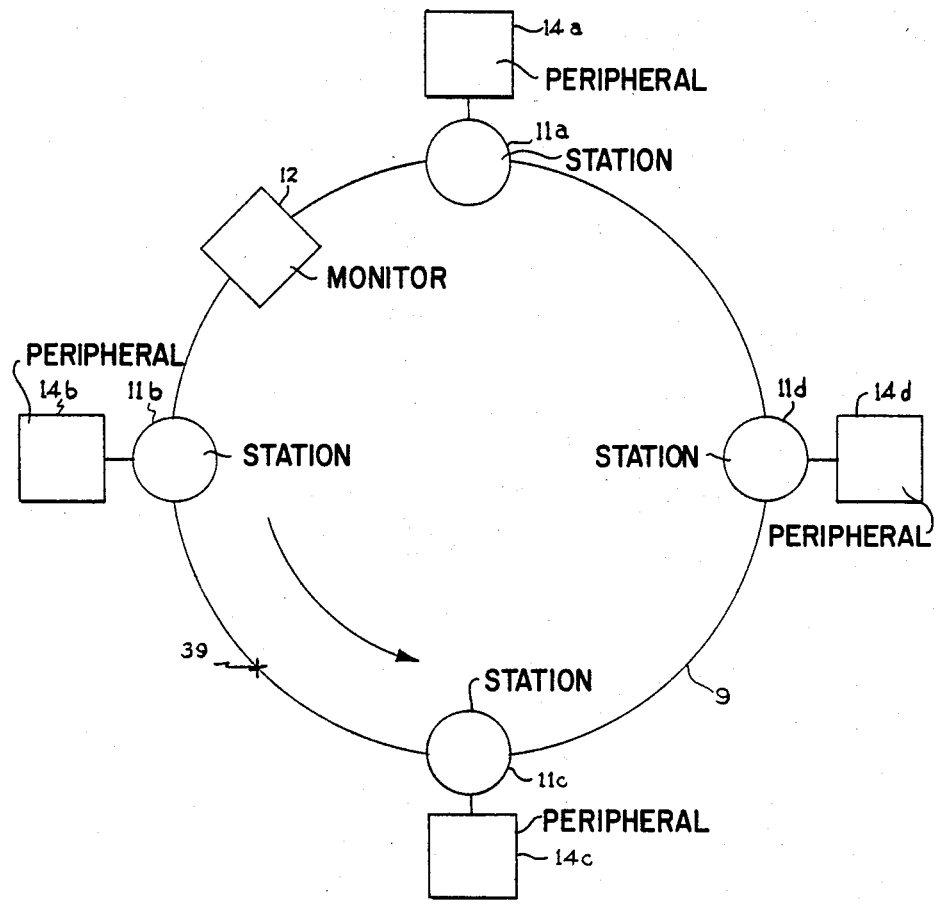
FIG. 3 shows a representative data ring and a break in the ring transmission cable.

The ring or loop is shown generally in FIG. 3 and in part in FIG. 1. The ring is shown in FIG. 1. as having a serial communications cable 9 with individual stations 11a–11d serially connected in the cable and with each station connected to its respective peripheral device 14a–14d. The station part of the loop corresponding to stations 11a–11d is shown generally by numeral 11 in FIG. 1 and in detail in FIG. 3, and includes a data in line (MDIN) 13, a data outline (MDOUT) 15, a clock timer 17, and interconnect device 19 receiving data from line 13 and transmitting data on line 15, a means 21 for use in synchronizing the ring interconnect device 19 with the data MDIN 13 on the input line. A control means 23 is provided for transferring data between the interconnect device 19, and the peripheral 14 connected through an interface unit 25 to the data ring 9.

Additionally included are a ROM 27 and RAM 29 which may provide working storage and instructions. A data bus 31 is provided for connecting the interface unit 25, the timing means 17, the control means 23, and the RAM 29 and ROM 27. An interrupt control bus may be provided between the timing means 17, the interconnector 19, and the control means 23, as is well-known in the art.

Additionally provided is a register 33 which contains the station 11 address and which is loaded into the interconnect device on demand as will be explained later.

The interconnect device 19 as shown in the preferred embodiment is serially placed in the loop and is controlled by the control means 27 which may be a microprocessor either to retransmit received data on line 13 through to line 15 and to another designated station in the loop or to extract data addressed to it or to transmit data to line 15 and to another station.

Figure 2:
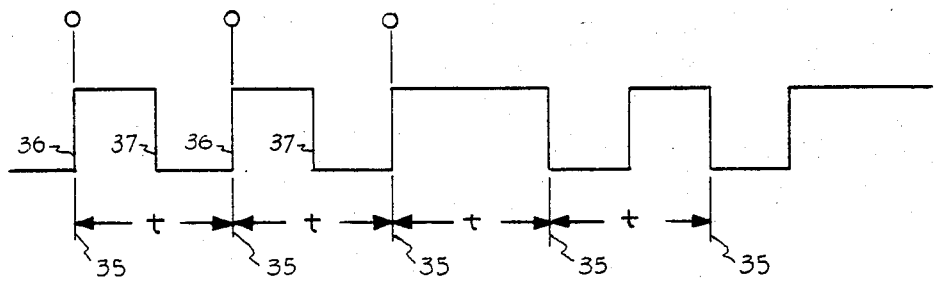
FIG. 2 shows a series of data bits in the format according to the data definition of the preferred embodiment.

The format of the encoded data which may be used and which is used in the preferred embodiment is shown in FIG. 2. That data is known as Manchester coding where a signal transition 36 must occur at a bit time 35 shown at the vertical hash marks. The bit times are separated by a period "t". In Manchester coding, as is well-known, a rising edge at the bit time 35 indicates a zero while a falling edge at that time indicates a one. If two consecutive bits are equal, then between the two bit times, the interbit time, the opposite type of edge 37 occurs.

As shown in FIG. 1, a monitor 12 may be inserted in a ring for such purposes as generating the data format in a packet string. Each packet string is separated by a code such as a stream of zeros. Each packet may be formed for example in a series of 64 bit locations with bits to mark the start of a packet string such as a one bit following a string of zero bits. A series of four packets, for example, may be assembled into a recirculating packet string.

However, it should be noted that the function shown by monitor 12 may be combined in a station 11 and the arrangement shown of the monitor and the stations is not necessary to the practice of the invention.

Figure 4:
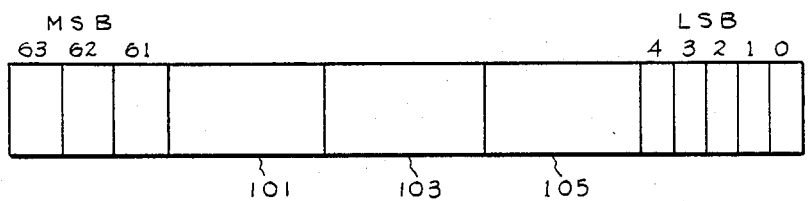
FIG. 4 shows a data packet for carrying data round the ring.

The packets are transmitted serially around the ring and information may be added to a packet by a station and transmitted to another station in the loop. The form of the packet may be as shown in FIG. 4 where the least significant or zero location data is used to indicate the start of the packet. Data bit location 2 may be used to indicate whether the packet is full or empty and may for example be marked with a 1 to indicate the packet is full.

Particular locations may be reserved in the packet for the destination address 105, the source address 103 and data 101.

Figure 5:
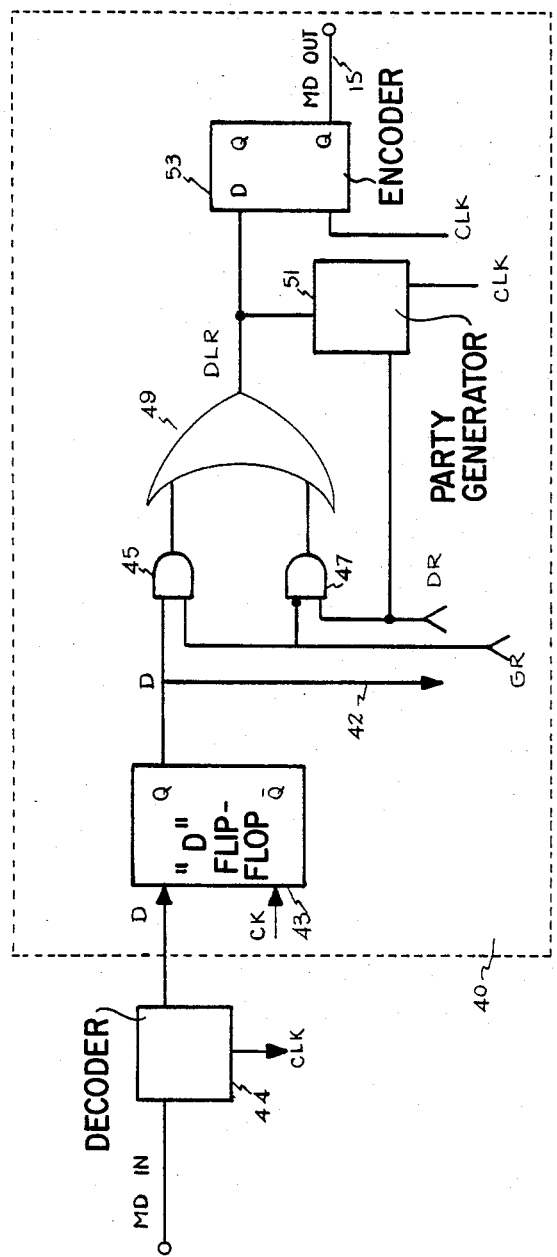
FIG. 5 shows the copy/modify multiplexer within the station interconnect device.

The copy/modify multiplexer 40 part of the interconnect device 19 is shown in FIG. 5. Its function is to either retransmit the data MDIN onto line 15 as MDOUT or to store it for transmission to the peripheral 14 if the packet is addressed to it or to transmit its own data to another station in the loop.

Figure 6:
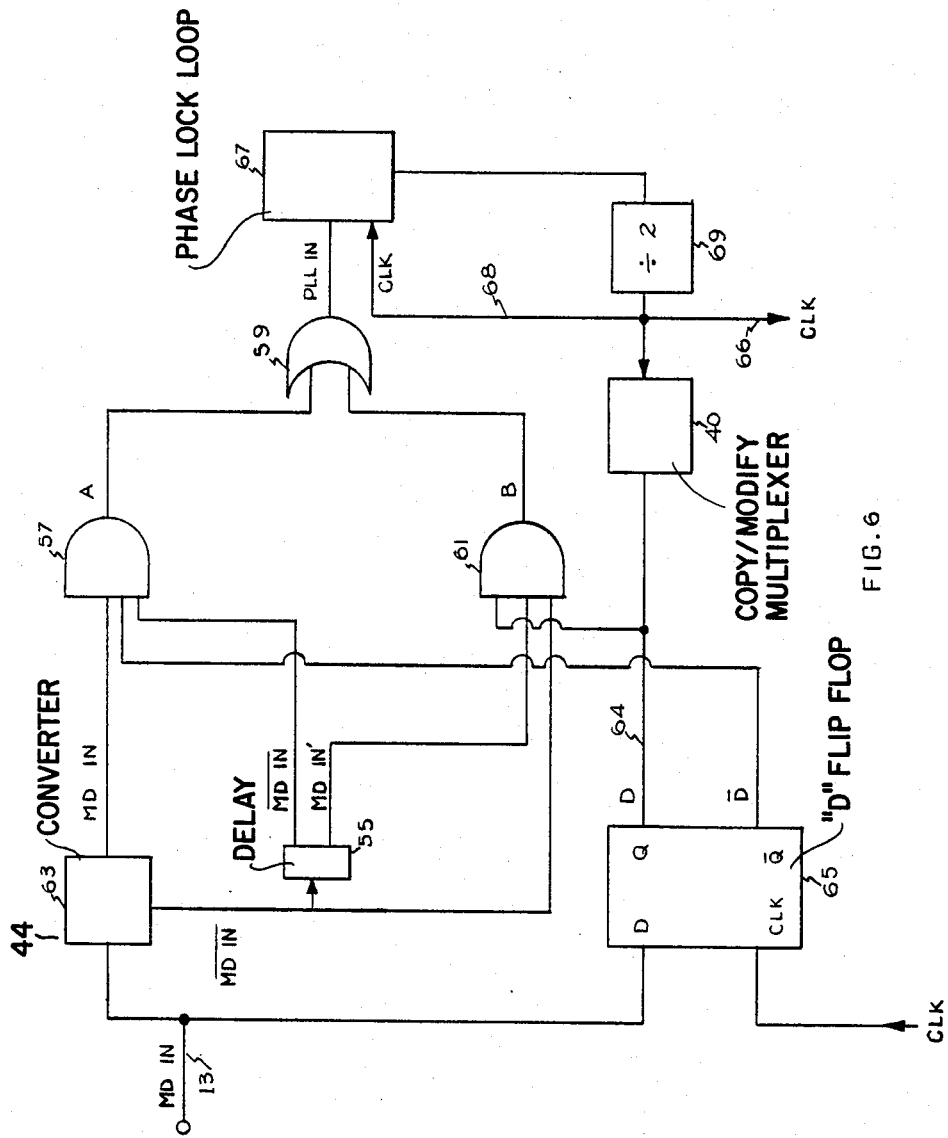
FIG. 6 shows the decoder portion of the station interconnect device and the phase locked loop.

Data MDIN in the form of the packet of FIG. 4 is received from line 13 by a decoder 44 shown in FIG. 6, and connected to D type flipflop 43. It is clocked into the flipflop 43 by clock signal CK which is synchronized with the MDIN data rate by the decoder 44. The data D is clocked out of the flipflop 43 and is provided to a buffer, not shown, for transmission to the peripheral 14 on the line 42 and at the same time provided to gate 45. Gate 45 is gated by control signal GR which causes the data D appearing at terminal Q of flipflop 43 to be gated to output terminal 15 through OR gate 49, and encoder 53, the encoded data appearing in line 15 as MDOUT.

However, when GR is low, gate 45 is disabled, and gate 47 is enabled, new data DR, originating in the station then is placed on output terminal 15 for transmission. The outputs of gates 45 and 47 are provided to OR gate 49 having an output shown DLR, provided to parity generator 51 which inserts the proper parity bit. The output of the parity generator 51 responsive to DLR provided to gate 47 to correct the parity of the encoded data MDOUT to output line 15.

The signals GR and DR are produced by an output control within interconnect device 19 and whose details are not shown but which are known to those skilled in the art. The output control responsive to the data content in the received packet and to the status of the station, as controlled for example by controller 23, and indicative of whether or not the station has data to transmit to another station, then provides the appropriate logic signal, GR of DR to control the data on line MDOUT 15.

If the information packet MDIN arriving on line 13 is empty and the station 11 has data for transmittal, then a data value "0" at terminal Q of type D flipflop 43 at the appropriate bit location in the packet such as the second will indicate an empty packet. The output control of the interconnect device 19 responsive to that indication and to a transmit instruction from controller 23 will set GR low enabling gate 47 while disabling gate 45 so that new data DR from the peripheral 14 may be inserted in the packet data locations and transmitted to output line 15 and into the ring to the designated station. If the packet is full as defined by bit position 1, then responsively the output control of interconnect device 19 will cause GR to go high even if a transmit instruction is present and the data MDIN will be reencoded by encoder 53 and placed back on the ring on line 15.

The data MDIN will continue to be retransmitted to line 15 until the acknowledged bit locations which may appear at the end of a packet for example in positions 62 and 63 have arrived at flip flop 43. Then, if the packet address in locations 105 matched the station address, and the data was received by the station and provided on line 42 to the peripheral, the interconnect device 19 then places the correct acknowledge code in the packet by bringing line GR low enabling gate 47 and inserting the proper acknowledge data DR into the correct packet locations as it is clocked out of the encoder.

The means for counting the bit locations in the packet may be a timing state decoder as known in the art or any other suitable device.

If the packet is full, and the destination address is not the same as for that station, responsively, the interconnect device 19 and controller 23 maintains line GR high enabling gate 45 and the data D is reencoded at encoder 53 and transmitted to the next successive station.

It may be recognized, many schemes may be devised using the destination address and the source address to cause data either to be copied or transmitted depending upon the source and/or the destination and with the interconnect device capable of placing acknowledge bits on the packet corresponding to the source and destination acknowledge scheme devised. Any suitable processing device may be used to identify the bit positions as a packet is being received and to load data in the proper packet positions.

The data D received by the copy/modify multiplexer shown in FIG. 5 is decoded from the Manchester coding of FIG. 2 by decoder 44 which receives MDIN directly from the loop and which is shown in detail in FIG. 6.

Figure 6A:
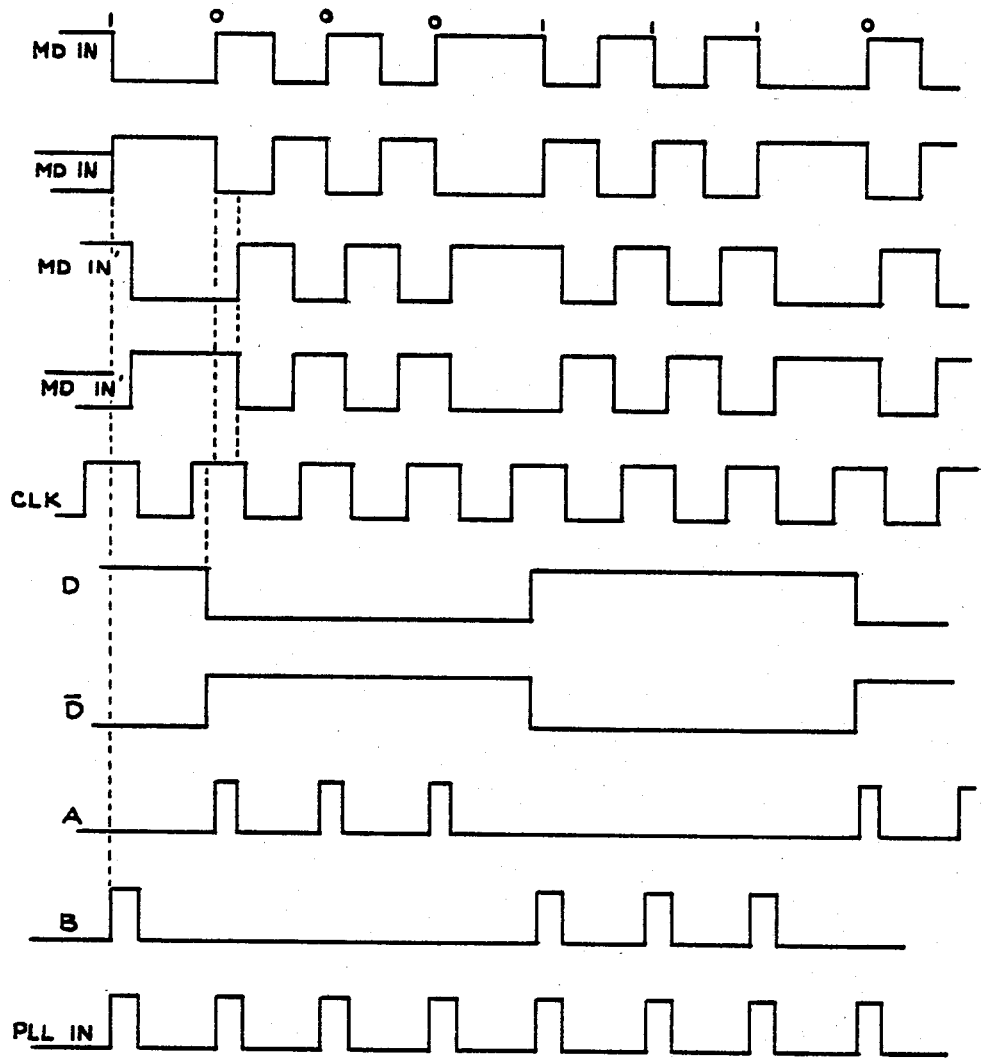
FIG. 6a is a timing diagram for the decoder shown in FIG. 6.

As shown in FIG. 6 and FIG. 6a, the decoder 44 produces a data signal D and the PLLIN timing pulse only at bit times regardless of the date state of MDIN existing on the ring.

The general object of the decoder 44 is to produce a timing pulse, PLLIN synchronized with the periodic data signal MDIN regardless of the data state of MDIN.

In the preferred embodiment, synchronization for the Manchester coded data, shown as MDIN in FIG. 6a, is at bit time. Bit time is denoted in the preferred embodiment by the I's and O's. indicating the data state of MDIN at periodic intervals t1, t5, t9, t13, t17, t21, t25, t29 and on. However, the phase relation of MDIN to PLLIN may be varied without departing from the principles of the invention.

The data signal MDIN is received from the ring on line 13 by decoder 44 and transmitted to a converter 63. Converter 63 produces the signal MDIN and $\overline{\text{MDIN}}$. The converter 63 may be an AND gate having both inputs tied to MDIN and producing an inverted and noninverted output, $\overline{\text{MDIN}}$ and MDIN.

MDIN is provided from converter 63 to delay 55 which produces $\overline{\text{MDIN}}'$ and MDIN'.

The signals at the output of delay 55 are delayed a portion of the interval of the data signal MDIN. As shown in FIG. 6a, the delay is approximately $\frac{1}{8}$ of the total bit time interval (t1 to t5). The width of the PLLIN timing signal is determined by the delay, and the delay may be changed to vary the width of PLLIN.

MDIN is also provided to the D input of D type flip flop 65. A second input is the clock (CLK) signal derived from the output of the Phase Lock Loop 67 and divide by two network 69. As shown, the CLK signal is provided on a feedback loop 68 to the phase lock loop 67 and to the station in general, as shown by the connection to the copy modify multiplexer 40.

The output of the D flip flop 65 is the data signal D from terminal Q and the data signal $\overline{D}$ from terminal $\overline{Q}$. Referring now to FIG. 6a, and the timing diagrams, the operation of the decoder is shown as producing a timing signal PLLIN synchronized to the Manchester encoded data signal MDIN and specifically in the example shown, at bit time, regardless of the state of MDIN.

Mask edge detectors 57 and 61 are alternately unmasked responsive to the MDIN data state and provide an output PLLIN to OR gate 59 to produce PLLIN. PLLIN can be produced continuously regardless of which data state MDIN is in at the moment. Starting with bit time t1, MDIN is shown in a data state "1". Data signal D is shown high while $\overline{D}$ is shown low. D Flip Flop 65 is switched responsive to the date state of MDIN at terminal D at the rising CLK pulse. The first rising CLK pulse occurs at t4 switching Flip Flop 65 responsive to the "0" data state causing D to go low and $\overline{D}$ to go high.

MDIN' and MDIN' follow MDIN with a slight delay as shown in FIG. 6a. MDIN' and MDIN' is shown delayed with respect to MDIN and MDIN by approximately an eighth of a bit time interval.

As stated, each of the masked edge detectors 57 and 61 are unmasked responsive to the respective data state of the MDIN data signal, and produce output A and B with respect to the state of the MDIN data signal.

The output signals A and B are then processed through OR gate 59 to produce the composite PLLIN signal.

In the preferred embodiment, the masked edge detectors 57 and 61 are shown responsive to the phase of the MDIN signal at bit time. However, as it will be known to those skilled in the art, the logic can be altered consistent with the principles of the invention to provide the output signals A and B from each of the masked edge detectors responsive to a different selected phase of the MDIN signal and to the respective data state of MDIN.

Starting at t1, where MDIN is shown in a "1" state, masked edge detector 61 responsive to MDIN, MDIN' and D produces a pulse B.

At t5, where MDIN is in a "0" state, edge detector 57 responsive to MDIN, ,ovs/MDIN/ ' and D produces a pulse A.

As shown then, regardless of the data state of MDIN, whether "1" or "0", either masked edge detector 57 or 61 will be unmasked producing a series of pulses forming timing signal PLLIN synchronized to a particular phase of the MDIN data signal on line 13. As shown at time t1, the state of MDIN is "1" shown by the negative going pulses. Immediately after t1, masked edge detector 57 responsive to MDIN data signal D and MDIN' produces a pulse B which is then processed through OR gate 59 as timing signal PLLIN.

As shown at t5, MDIN has undergone a change from "1" to "0" at bit time and states of MDIN', and MDIN', are also changed accordingly as shown in the timing diagrams of FIG. 6a. The state of data signal D and D at the output of Q and Q output of flip flop 65 are also changed responsive to rising CLK and the data state of MDIN at terminal D.

The conditions for unmasking detector 61 are no longer present during the "0" data state but are now present for unmasking masked edge detector 57 to produce pulses at output A and which are then processed through OR gate 59 as PLLIN.

As shown, masked detector 57 is responsive to MDIN, D and a MDIN'. These conditions occur at bit times t5, t9, and t13 when the MDIN data state is "0". The pulses at output A continue from t5 to t13, after which the state of MDIN changes from "0" to "1", disabling the detector 57 and enabling detector 61 to produce the series of pulses at output B from t17 to t25. At t29, edge detector A is enabled responsive to a change in MDIN from "1" to "0".

Where at this data state MDIN changes again as shown between t13 and t17, the masked edge detector 57 is disabled and detector 61 is enabled to produce pulses at output B.

The phase lock loop 67 responsive to PLLIN timing signal, provides a timing signal to divide by two network 69 and then back as the CLK signal on line 68 which phase locks the CLK signal to the PLLIN.

The decoder 44 shown in FIG. 6 provides a data signal D then on line 64 and a timing CLK signal on line 66 synchronized to the data rate on the ring and with the result that each station in the rate is synchronized to the transmitted data rate.

As in serial loop devices, the packet is loaded with the data destination address (DA) of the station designated to receive the data and the source address (SA) of the transmitting station. The packet is defined by a finite number of bits, each bit identified by a numbered position in the packet. The identified positions are loaded with the appropriate data so the data positions in the packet can be properly interrupted.

Each interconnect device 19 has associated with it a means for indicating its station address. This address is loaded into the interconnect device 19 for example, when a full packet is received and the packet DA and or SA compared with the receiving station address and/or transmitting station address. For transmission, the address is loaded into the interconnect device 19 and into the designated packet SA positions by the copy multiplexer shown in FIG. 5.

The station means containings its respective address includes means for loading the address or any other multibit data word serially into the interconnect device avoiding parallel loading. The address data is clocked into a comparison means in the interconnect device 19 for comparison with the received address.

The address means is shown as register 33, serially connected to interconnect device 19 through bus 33a. A series of switches 33d may be provided with the station address and that address is loaded into a register 33 for comparison as explained.

Figure 7:
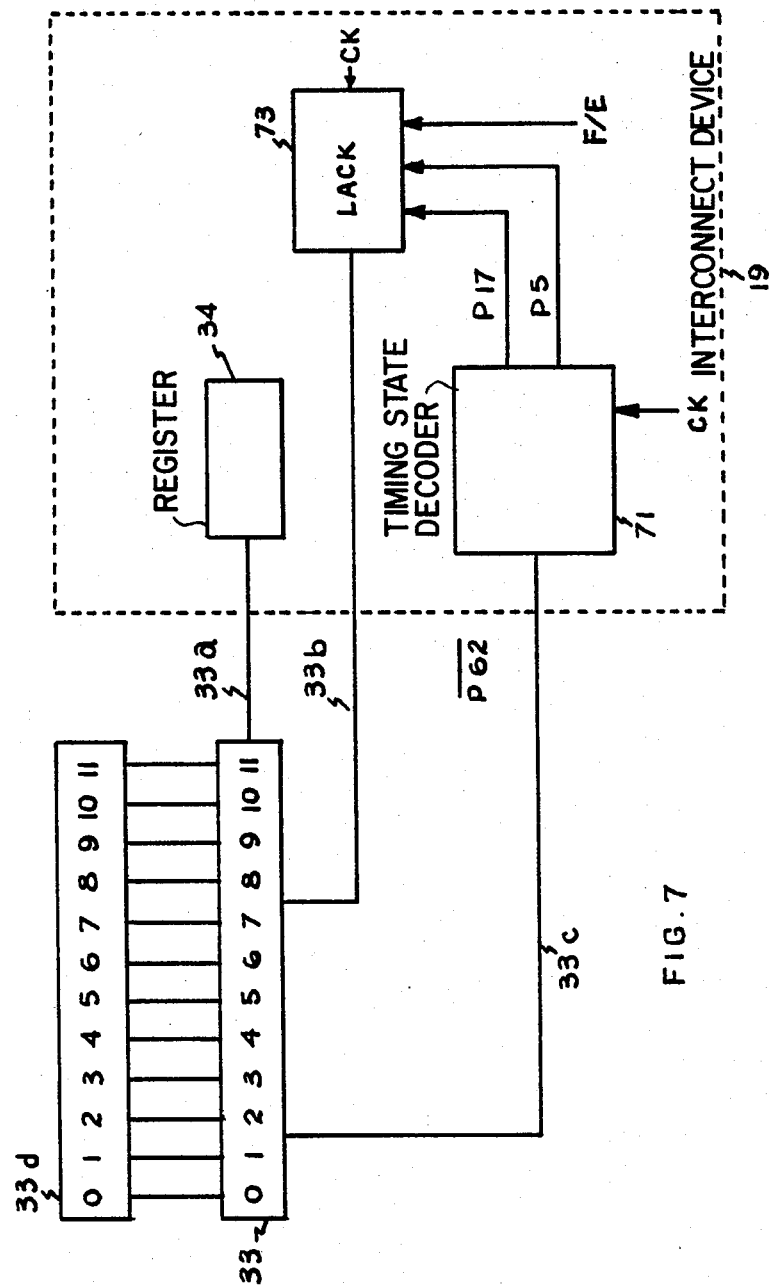
FIG. 7 shows the means for loading the station address into the station interconnect device for comparison with the packet destination address.

The address means and the interconnect device 19 is shown in greater detail in FIG. 7.

To serially clock the station address from the register 33 through bus 33a into the address register 34 in the interconnect device 19, clocking signals enabling the serial loading of the address data are provided on line 33b by LACK logic element 73 in interconnect device 19. The LACK logic in turn may be enabled by the timing state decoder 71 providing state signals P0 to P63 corresponding to a data position 0 to 63 in incoming packet MDIN, such as data position 5 or 17 and depending upon whether the station address is to be compared to the destination address (DA) in the incoming packet, or whether the station address is to be used as a source address (SA) for a packet to be transmitted by the station. As shown in FIG. 4, each incoming packet has a bit position to indicate whether the packet is full or empty of data. This may be for example bit position 1. LACK logic 73 responsive to a decoded data indication of whether the packet is full or empty (F/E) then causes the address to be serially read from the register 33 into register 34 in the interconnect device 19.

The interconnect device 19 is provided with a timing state decoder 17 which provides signals P0 to P63 indicative of the packet bit position being received by the station. The decoder 17 is clocked by timing signal CK at the data rate and may be synchronized with the start of a packet in any known manner. For example, a gap of coded zeros may be inserted between packets placed in the ring, and the decoder may be enabled by suitable logic responsive to a first "I" bit indicating the start of the packet received by the interconnect device 19. The timing state decoder may count from P0 to P63 responsive to the number of 64 bit positions in a packet. In the preferred embodiment, the packet has 64 bit positions and signal P63 is generated with the first bit position of a packet and P62 is generated with the last bit of a packet.

Response to timing signal P62, for example, the address set into the switches 33d is loaded into the register 33. As the object is to serially load the contents of register 33 into the interconnect register 34, timed with the arrival of selected data positions such as the DA data positions or the SA positions, in the packet, timing state signals P5 and P17 are provided to the LACK logic together with the data value contained in the packet Full/Empty bit positions 2 corresponding to state signal PI.

Where the address is to be compared with the incoming DA, responsive to a "Full" or 14 bit in bit position 2, the LACK logic would then provide clocking pulses CK on line 33b to load the address upon receiving timing signal P5, corresponding to the start of the DA bit positions in the incoming packet.

Where for example, the address is to be loaded into a packet for transmission to another station, the LACK logic may load the address responsive to an "Empty" or "0" bit in position 2 and timing state P17, the start of the SA bit positions in the packet.

The logic for the timing state decoder and other associated elements are well-known and not shown in detail.

In this way, data may be loaded serially into the interconnect device through a single bus and terminal, saving terminals. This is further accomplished by synchronizing the address loading with the arrival of the proper data bit positions in the packet.

Each station further contains a means to locate discontinuities or breaks in the ring such as 39 (FIG. 3) or an inoperative station. Cable break location is accomplished by first sensing the occurrence of invalid data resulting from a break and within a time or a predetermined bit stream length. The presence of invalid data at each station then produces an indication of invalid data (ID) at the station immediately successive to the break and others following interconnect device 19. The indication may be for example an I.D. flag. The interconnect device 19 responsive to the ID flag then clears the line by sending valid data in the form of a bit stream of zeros and which is received as valid data by every other station interconnect device downstream in the direction of data flow between a sending station device and the cable break 39.

Figure 8:
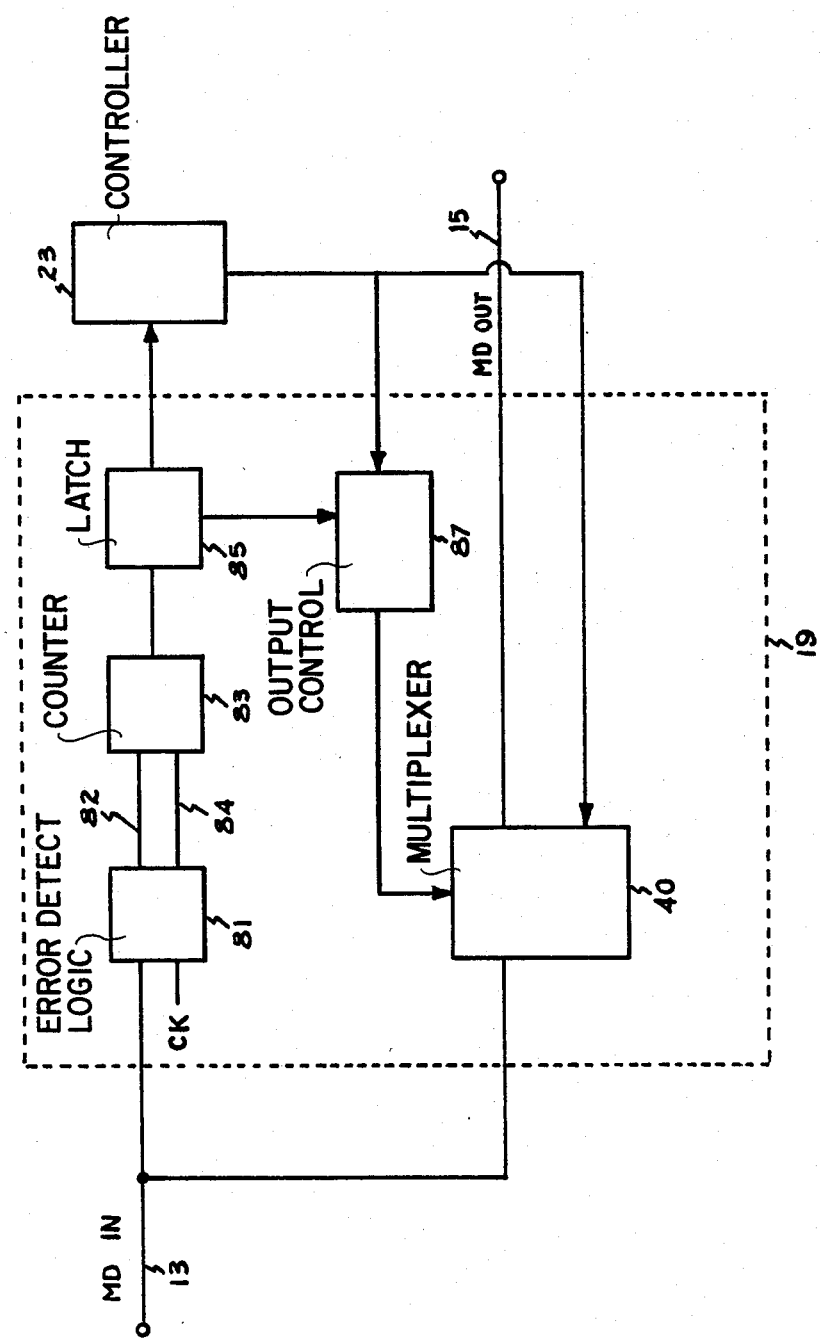
FIG. 8 shows the means within the station inter-connect device detecting and signaling a discontinuity of a cable break in the ring.

Valid data sent by any station will be received by every other station located in the data loop between the sending interconnect device and the break 39. The cable break detection logic within the interconnect device 19 for each station 11 is shown in FIG. 8 in functional block form the details of the structure of each functional block being within the skill in the art.

A coding error detection logic element 81 receives the ring data MDIN on line 13 and inspects MDIN for an edge occuring at bit time. As shown in FIG. 6a, the clock signal CK generated by the phase lock loop 67 rises before and falls after the data bit time. The data MDIN is sampled by logic element 81 on these two CK edges. For valid data where a bit transition occurs, the two samples are at different levels. For invalid data, the samples do not differ. If this condition persists for a predetermined time, then a cable break is flagged at the interconnect device 19.

At each occurrence of invalid data relative to a bit time for example, error detect logic 81 provies an invalid data signal to counter 83 on line 82. Counter 83 counts the error signals generated by the detector 81 and generates a latching signal to cable break latch 85 as shown. Counter 83 may be for example an eight bit counter which would generate a cable break latching signal at the occasion of the 256th count. The cable break latch signal appearing at the output of latch 85 would then be used to generate an interrupt in the controller 23.

Counter 83 would retain its full count as long as the invalid data condition continued it would not reset to 0 until valid data appeared, causing it to count down to 0.

Counter 83 is an up/down counter. The appearance of valid data at each bit time would cause error detector 81 to produce a valid data signal on line 84 and the counter to count down. The logic scheme may be so established that counter 83 removes its latch signal at a 0 count, subsequent to the cable break latch being set.

If noise on the line causes counter 83 to count up to less than its full count, for example 127, and then valid data was resumed or of an intermittent break causes the occasion of invalid data for a count less than a predetermined duration count, the counter 83 responsive to valid data would proceed to count down to a zero. The counter 83 counts down responsive to valid data to insure a predetermined amount or duration of invalid data is required before the cable break flag is set by latch 85. After the flag is set, a sufficiently long stream of valid data is required to cause the counter 83 to count down to zero removing the flag, the counter latching signal and the interrupt. The criteria for setting and removing the flag can be changed without departing from the principles of the invention.

As would be apparent to one skilled in the art, the duration of invalid data can be changed by extending the capacity of the up/down counter for example by adding additional counters. As will be further apparent, the method for sensing invalid data may also be changed without departing from the inventive concept to be compatible with any other data format used in the ring. The data format shown being the mode chosen for the preferred embodiment.

An output control 87 upon occurrence of the latch signal from latch 85 and responsive to the controller 23 causes a series of valid data bits to be placed in the loop through the copy modify multiplexer 40, shown in detail in FIG. 5. The data may be a continuous stream of "0" bits, and is transmitted to the next station located down stream in the loop, for example from 11c to 11d.

Referring now to FIG. 3, and assuming that the cable break occurred at 39, As the break would prevent valid data from reaching station 11c and its further retransmission to stations 11b and 11a.

As valid data counter 83 in each station is increased to its full count at the clock rate CK a flag and a cable break interrupt is generated to the controller 23 at the respective station.

After a predetermined time, set for example by a timer, in the station controller 23 would cause valid data to be placed on the line through its multiplexer 40. For example, valid data would be placed on the line through station 11c, station 11d, 11a and station 11b. Station 11d would then receive valid data from station 11c causing its up/down counter 83 responsive to the valid data to count down to zero and to remove the cable break latch and interrupt to its controller 23.

As in the case of station 11d, stations 11a and 11b receiving valid data from stations 11d, and 11a would respond by down counting counter 83 and responsively removing their cable break latch flags and interrupts. Subsequent to the interrupt and flag removal, a station may be inhibited from transmitting until a reset order is received.

Station 11b will now send valid data. However, because of the break 39, station 11c will be unable to receive the valid data and its cable break latch flag and interrupt will continue in its set condition.

A predetermined time after the interrupt set by a timer in control 23 for example, the controller 23 of station 11c will cause a packet to be transmitted by its interconnect device 19 to the loop. The packet will contain the station address to identify the transmitting station. The packet may also be addressed to another station or to a monitor 12. The receiving station or monitor would then identify the sending station and the cable break as located in the ring part between that station and a preceding station (11c and 11b) and possibly including the preceding station (11b).

If another station on the line is ready to transmit at the time of cable break, then the cable break interrupt can be used through the station's controller to inhibit transmission after the up/down counter is counted down and its cable break latch removed, and until a sufficient time lapses for another station, such as 11c immediately downstream of the break 39 to send its station identification.

Or as shown in the preferred embodiment, where a monitor 12 is responsible for establishing data packets, no valid data can be transmitted after a cable break until the monitor 12 is reset and again generating empty packets received by each station, no transmission can be made and the only transmission on the line will be from that station such as 11c, and immediately downstream of the break. With that single packet of information transmitted and received by source 12, the identification is a simple matter.

Although ring communication devices for data are well-known, several problems exist which are solved by the means disclosed.

In any ring system, the station interconnect devices must be synchronized with the data rate on the loop. In this device, the data has transitions at bit times in opposite directions for different data states. That date is sampled using a masked edge detector so that a timing pulse is produced in phase with the bit transitions. This timing pulse is then used in a conventional manner through a phase lock loop to generate the clock signal synchronized with the data rate on the line.

Further, a method and apparatus is shown for detecting a discontinuity or cable break and locating that cable break by identifying a station in the ring immediately upstream, in the direction of data flow, from the break.

Further shown is a method and apparatus for serially transferring data such as a station address in synchronism and in time relation to specific data locations in a packet, and through a single terminal in the interconnect device avoiding an additional number of terminals for the reception of parallel data.

We claim:

1. A method of locating a discontinuity in a data transmission ring having a plurality of stations randomly receiving and transmitting data along the said ring, comprising the steps of:
   (a) sensing the occurrence of valid data and invalid data at said stations,
   (b) at said stations, comparing the number of said valid data occurrences to said invalid data occurrences,
   (c) producing an invalid data indication, at respective stations, in response to said invalid data occurrences exceeding said valid data occurrences,
   (d) at respective stations having said invalid data indication, initiating the transmission of a stream of valid data,
   (e) at respective stations receiving said stream of valid data and responsive to said stream of valid data, removing said invalid data indication and at respective stations not receiving said stream of valid data, retaining said invalid data indication,
   (f) at said stations retaining said invalid data indication, and responsive to said retained invalid data indication, transmitting the address of said station,
   (g) locating said discontinuity relative to the said address of said station.

2. The method of claim 1 where said step (g) of locating the said discontinuity includes the step of identifying the location of the station having the said respective address.

3. The method of claim 1, wherein the said transmitted data has periodic transitions related to the data rate and said step (a) of sensing the occurrence of valid data and invalid data includes the step of sampling the data prior to and subsequent to the said transitions and indicating the occurrence of invalid data responsive to the absence of the said transition between the said samples.

4. The method according to claim 1, wherein the step (b) of comparing the number of valid data occurrences to the number of invalid data occurrences includes the step of counting the number of said invalid and valid data occurrences and said step (c) of producing an indication of the invalid data occurrences exceeding the valid data occurrences includes the step of counting the invalid data occurrences and the valid data occurrences and producing the said indication when the said invalid data count exceeds the said valid data count by a predetermined amount.

5. The method according to 4, where the step of counting includes the step of incrementing a counter for each invalid data occurrence and decrementing the counter for each valid data occurrence and the step of providing an indication of the said invalid data occurrences exceeding the valid data occurrence by a predetermined amount includes the step of producing the said indication responsive to the said counter accumulating a first predetermined count, of said predetermined excess of invalid data occurrences, and the step of removing the invalid data indication includes the step of accumulating a second predetermined account and removing said invalid data indication responsive to said second predetermined count.

6. A method according to claim 5, wherein the said first predetermined count and said second predetermined count are the same.

7. The method according to claim 5, wherein the said second predetermined count and said first predetermined count are different numbers.

8. The method of claim 1, wherein said step (c) of producing said invalid data indication at a respective station, includes the step of inhibiting data transmission at said respective station.

9. The method according to claim 1, wherein said step of identifying the said discontinuity includes the step of identifying the said discontinuity in the ring portion between the said station having the said transmitted address and the next preceding station in the ring relative to the direction of data transmission and including the said next preceding station.

10. A method of locating a discontinuity in a data transmission ring having a plurality of stations located in the ring for receiving and transmitting data along the ring comprising the steps of:
  (a) sensing the occurrence of invalid data at said stations,
  (b) responsive to said sensing of invalid data, providing an indication of said invalid data for respective stations,
  (c) temporarily halting the transmission of said data from said stations having said invalid data indication and for a predetermined time, and then reinitiating the transmission of a continuous valid data stream through successive stations in the ring,
  (d) sensing the presence of said reinitiated data stream at said successive stations, and responsive thereto, removing said invalid data indication,
  (e) after a predetermined time, sensing the continuation of an invalid data indication at respective stations, and transmitting the address of said respective station having said retained invalid data indication, and
  (f) identifying the location of said discontinuity relative to the address of said transmitted station address.

11. A system for locating a discontinuity in a data transmission ring having a plurality of stations randomly receiving and transmitting data along the said ring, comprising,
  (a) sensing means for sensing the occurrence of valid data and invalid data at said stations,
  (b) comparing means at said stations for comparing the number of said valid data occurrences to said invalid data occurrences,
  (c) producing means for producing an invalid data indication at respective stations in response to said invalid data occurrences exceeding said valid occurrences,
  (d) said producing means including means responsive to said invalid data indication for reinitiating the transmission of a stream of valid data at respective stations,
  (e) said producing means including means responsive to said stream of valid data received from others of said stations in the ring for removing said invalid data indication at said respective stations, and for retaining said invalid data indication at said stations not receiving said stream of valid data,
  (f) said producing means including means responsive to said retained invalid data indication for transmitting the address of said stations retaining said invalid data indication,
  (g) means for locating the said discontinuity relative to the said transmitted address.

12. The system according to claim 11, where the stations includes means for transmitting data having periodic transitions related to the data rate, and the sensing means for sensing invalid data includes means for sampling the data prior to and subsequent to the transitions and indicating the valid data occurrence responsive to the absence of the transition between samples.

13. The system according to claim 11, where the said comparing means includes means for counting the number of successive ones of said invalid and said valid data occurrences and providing a first indication when said invalid data occurrences exceed the said valid data occurrences by a predetermined amount and providing a second indication when said invalid data occurrences do not exceed said valid data occurrences by said predetermined amount.

14. The system according to claim 11, wherein said means for reinitiating the transmission of valid data includes means for discontinuing the transmission of data in response to said invalid data indication and means for reinitiating the transmission of said stream of valid data after the said discontinuance of said data transmission.

15. The system according to claim 11, where the second predetermined count is a zero count.

16. A system for locating a discontinuity in a data transmission ring, having a plurality of stations randomly receiving and transmitting data along the ring comprising means for sensing the occurrence of invalid data at at least the stations, means for providing an indication of the invalid data occurrences at the stations, means for initiating the transmission of valid data at the stations responsive to the invalid data indication, means for removing the invalid data indication at stations receiving the transmitted valid data, and means for initiating the transmission of data at a station, the data including the station identification, responsive to the presence of the invalid data indication at the station.

* * * * *